Patented Nov. 18, 1941

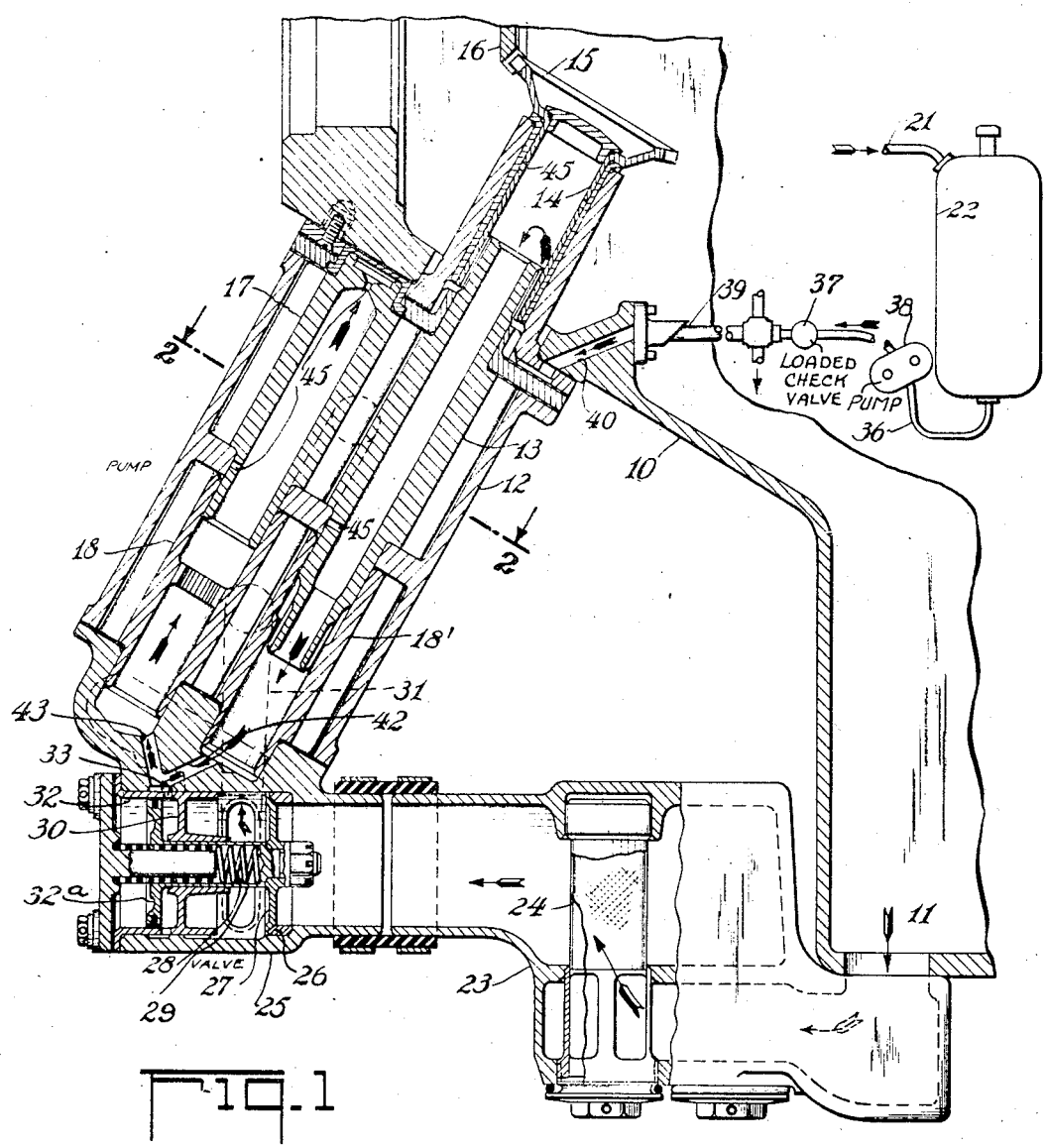

2,263,414

UNITED STATES PATENT OFFICE 2,263,414

FLUID CIRCULATING SYSTEM

Frederick Beneshek, North Bergen, and Thomas M. Ryan, Paramus, N. J., assignors to Wright Aeronautical Corporation, a corporation of New York Application July 3, 1940, Serial No. 343,708

13 Claims. (Cl. 123—196)

This invention relates in general to fluid circulating systems and in particular comprises improvements in the lubricating oil circulating system for aircraft power plants.

The usual aircraft power plant comprises an engine incorporating a pressure oil pump which draws oil from an external oil tank, the pressure pump forcing oil to the various parts of the engine requiring lubrication, whence the surplus oil collects in a sump at the bottom of the engine from which it is pumped by an engine driven scavenging pump back to the oil tank. The scavenging pump serves to maintain the interior of the engine free from excessive accumulation of lubricant. Frequently, the oil tank, or at least the upper level of the oil therein will be considerably higher than either or both of the oil pumps and, if an aircraft in which the power plant is installed is unused for a considerable interval, lubricant from the tank will gradually seep into the engine, so that when started, there is an excessive accumulation of oil in the engine crankcase which is generally objectionable in that it prevents easy starting, causes a great deal of smoke upon starting, and may at times even drip into the engine cylinders to foul the spark plugs and fill the compression space in the cylinders with the possibility of bursting them upon applying engine starting torque. To overcome accumulation of oil in the engine, engine specifications usually call for a minimum leakage requirement by which the pumps shall only pass a specified amount of low viscosity fluid placed under a gravity head. To meet the specifications, it is preferable to place spring loaded check valves in the lines near the pumps. This is satisfactory for the pressure oil pump since the gravity head imposed on the pump is so much less than pump pressure when the engine is operating that the check valve will have little restrictive effect upon pump output. In the scavenging system, however, there is practically no pressure in the engine sump and there is comparatively little pressure at the scavenge pump delivery so that a check valve in the scavenge pump line, if capable of holding the gravity head, would substantially obstruct the flow of scavenged oil, particularly at high altitudes. This condition would be extremely objectionable in that very free flow of scavenged oil in its passages is necessary to promote good scavenging of oil from the engine crankcase.

An object of this invention is to provide a check valve in the scavenge or low pressure line of a circulating system which shall be capable of holding the line closed against fluid leakage during non-operation of the mechanism, but which will fully open to allow free fluid passage when the mechanism is in operation.

A further object of the invention is to provide, in an engine scavenging system, a check valve capable of holding gravity heads of lubricant, but operable in response to running of the engine to open the scavenge passages for unobstructed flow.

An object associated with the last above enumerated is to actuate the scavenge line check valve by means of fluid pressure developed by the pressure oil pump of the system.

Further objects of the invention will be appreciated in reading the annexed detailed description in connection with the drawing, in which:

Fig. 1 is a section through a lower portion of an engine crankcase, including a scavenge pump and scavenge oil passages, the section shown being represented in association with a pressure oil pump and tank diagrammatically represented; and Fig. 2 is a section on the line 2—2 of Fig. 1.

In the drawing, 10 represents a fragment of an internal combustion engine crankcase and oil sump, the latter being marked 11. To the crankcase is attached a scavenge pump comprising a housing 12 and a pump gear 13 driven through a sleeve 14 from a gear 15 which is meshed with a gear 16 associated with the engine crankshaft system, not shown. The gear 13 is meshed with a pump idler gear 17 as is clearly shown in Fig. 2 and each of gears 13 and 17 has a tandem gear 18 concentric therewith to provide additional pump capacity. In effect, however, the gears 13, 17, 18 and 18' comprise a single scavenging pump which delivers oil from its outlet 20 to a conduit 21 entering an upper part of an oil tank 22. Scavenged oil, represented by open arrows, passes from the sump 11 through a casting 23 incorporating an oil screen 24 to a valve unit 25. The latter comprises a seat 26 upon which a valve 27 rests, said valve being urged toward the seat 26 by a spring 28, the spring being embraced by a sleeve 29 which is carried in a guide 30. Oil in the valve housing 25 flows therefrom through a conduit 31 which establishes communication from the valve housing 25 (between the valve 27 and the guide 30) to the intake side of the scavenging oil pump housing 12. To the left of the guide 30 a cylinder 32 is formed in which a piston 32ª is slidable, the piston being integral with the sleeve 29. The cylinder 32 is formed with a port 33 into which pressure oil may be led as will shortly be described.

From the oil tank 22 a conduit 36 leads to a pressure oil pump 38, thence to a lightly loaded check valve 37 and thence to the engine lubricating system. From the pressure system, fed by the pump 38, a conduit 39 leads to a passage 40 in the crankcase 10 through which pressure oil flows as shown by the solid head arrows, to the hollow shaft of the pump gear 13. The oil passes down the pump gear hollow to a passage 42 open to the port 33 and likewise open to a passage 43 communicating with the hollows of the pump gears 18 and 17. Flow of pressure oil through the hollow scavenge pump gears serves to lubricate the pump gear bearings by suitable ports such as 45. This pressure oil, passing into the cylinder 32 through the passage 33, moves the valve 27 from its seat 26 and holds it open so long as pressure oil is available, providing a free passage for scavenge oil through the element 23, through the valve and to the scavenge pump inlet. So soon as the engine is stopped and oil pressure dies to atmospheric, the oil behind the piston 32 will gradually seep into the sump and allow the spring 28 to close the valve 27 against its seat. Likewise, the loaded check valve 37 associated with the pressure pump 38 will close, the loading of both the valves 27 and 37 being sufficient to hold these valves closed against the gravity head exerted by oil in the tank 22. Thus, when the engine is stopped, there is no possibility of gradual seepage of oil from the tank into the engine crankcase.

Although the invention has been described particularly in connection with internal combustion engines for aircraft use, it is equally applicable to fluid circulating systems used in other environments, the particular essence of the invention comprising a check valve in the low pressure conduit of a fluid circulating system which is openable in response to the existence of fluid pressure in the high pressure line of the fluid circulating system. A further extension of the scope of the invention consists in making a check valve in a low pressure line of a circulating system responsive to operation of the mechanism with which the system is associated.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an engine comprising engine driven pressure and scavenging pumps connected with an oil reservoir, a shut-off valve between the engine and the scavenge pump intake, and means actuated by oil pressure from the pressure pump for opening said valve.

2. In an engine comprising a pressure oil pump, an oil reservoir from which oil is delivered to the engine by the pump, a scavenge line from the engine to the reservoir and a scavenge oil pump in said line; a valve in said line, resilient means to urge said valve closed, and means responsive to pressure from said pressure oil pump to open said valve.

3. In a fluid circulating system comprising high and low pressure lines leading between a fluid reservoir and a mechanism, means to isolate the mechanism and reservoir when the mechanism is stopped comprising a check valve in the high pressure line, a valve in the low pressure line including resilient means to hold same closed, and a hydraulic motor actuated by high fluid pressure from the high pressure line for opening said low pressure line valve.

4. In a fluid circulating system comprising high pressure and scavenge lines leading from a reservoir to a mechanism and from the mechanism to the reservoir, respectively, a high pressure pump in the pressure line, a spring loaded check valve in the scavenge line, and means actuated by high pressure fluid from the high pressure line for opening said check valve.

5. In a fluid circulating system between a reservoir and a mechanism, a pressure feed line from the reservoir to the mechanism, a scavenge line from the mechanism to the reservoir, a check valve in the latter line, and means actuated by fluid from the pressure feed line for opening said check valve.

6. In a power plant including an engine having engine driven pressure and scavenge pumps for lubricant and a reservoir from and to which respective pumps pass lubricant, means for isolating the reservoir from the engine when the latter is not operating comprising a loaded one way valve in the pressure pump system allowing passage of lubricant from the reservoir to the engine when the engine operates but preventing such passage during non-operation due to loading of the valve, a loaded one way valve in the scavenge pump system which closes due to its loading when the engine is not operating to prevent lubricant passage between the engine and reservoir, a motor movable to open the latter one way valve, and a connection from the pressure pump to said motor whereby the motor is operated in response to pressure pump operation.

7. In a fluid circuit having high pressure delivery and low pressure return conduits, a loaded valve in the low pressure conduit closable upon no fluid flow in the circuit, and means to open said valve in response to fluid pressure in the high pressure delivery conduit.

8. In a fluid circuit subject to an enforced large head and to a low static head, a high pressure delivery conduit having a loaded check valve the load thereof being capable of resisting the low head but being inadequate to resist the large head, a low pressure return line, a loaded valve therein the load thereof being capable of resisting the low static head and being also capable of substantially resisting the low return pressure, and means operated by high fluid pressure from the delivery conduit to overcome the return line valve load and to open said valve.

9. In a mechanism subject to starting and stopping and provided with a fluid circulating system including a low pressure fluid scavenging line, a spring loaded valve in said line to prevent flow therethrough when the mechanism is stopped, and motor means positively operated by starting and operation of the mechanism for opening said valve against its spring load to permit free fluid circulation therethrough.

10. In a fluid circuit having high pressure delivery and low pressure return conduits, a loaded valve in the low pressure conduit closable upon no fluid flow in the circuit, and a motor operable by fluid pressure in the high pressure conduit to open said valve.

11. In a fluid circulating system comprising high and low pressure lines connecting a fluid supply and a mechanism, a valve in the low pressure line, and means actuated by fluid pressure in the high pressure line for opening said valve.

12. In a fluid circulating system comprising a pump delivering fluid under pressure to a mechanism, a scavenge line leading from the mechanism, a valve in said line, and means for opening said valve in response to fluid under pump pressure.

13. In a mechanism including an oil sump, a scavenge pump for draining the sump, a pressure pump for feeding lubricant to the mechanism and in restricted communication with the scavenge pump whereby, when the mechanism is stopped, fluid from one pump system may seep into the other and into the sump, a loaded check valve in the scavenge pump intake, and means responsive to fluid pressure from the pressure pump to open said valve.

FREDERICK BENESHEK.
THOMAS M. RYAN.